United States Patent

[11] 3,555,360

| [72] | Inventors | Sung Chuel Lee<br>Bridgeport;<br>Clifford E. Brockway, North Haven, Conn. |
|---|---|---|
| [21] | Appl. No. | 808,756 |
| [22] | Filed | Mar. 20, 1969 |
| [45] | Patented | Jan. 12, 1971 |
| [73] | Assignee | Harvey Hubbell, Incorporated<br>Bridgeport, Conn.<br>a corporation of Connecticut |

[54] PHASE CONTROLLED GROUND FAULT CIRCUIT INTERRUPTER
10 Claims, 2 Drawing Figs.

[52] U.S. Cl............................................. 317/18,
317/27, 317/33, 317/148.5, 324/127
[51] Int. Cl...................................................... H02h 3/28
[50] Field of Search.......................................... 317/18D,
18, 27, 10, 33SCR, 148.5B; 324/127; 323/56

[56] References Cited
UNITED STATES PATENTS

| 3,187,225 | 6/1965 | Mayer........................... | 317/18X |
| 3,296,493 | 1/1967 | Whittaker et al............. | 317/18 |
| 3,356,939 | 12/1967 | Stevenson..................... | 317/18X |
| 3,376,477 | 4/1968 | Weinger........................ | 317/18X |

Primary Examiner—James D. Trammell
Attorney—Wooster, Davis & Cifelli

ABSTRACT: A ground fault circuit interrupter of the type which includes a differential transformer having a toroidal core, two identical primary windings of opposing polarity, and a secondary winding. In this invention, a biasing winding is also added to the core which normally opposes one primary winding and aids the other. During normal operation, the biasing winding induces a voltage in the secondary winding which keeps the load circuit breaker closed. The circuit breaker opens when the secondary voltage drops below an established minimum value.

PATENTED JAN 12 1971

3,555,360

INVENTORS

BY

ATTORNEYS.

PHASE CONTROLLED GROUND FAULT CIRCUIT INTERRUPTER

BACKGROUND OF THE INVENTION

A ground fault circuit interrupter is a device which interrupts a circuit upon the occurrence of a ground fault current of substantially less magnitude than required to activate other types of protective devices. The ground fault current which will activate such a device is also substantially less than the current which poses a shock hazard to humans—for example, less than .1 ampere. As these devices are fast acting, current flow through a human body to ground is sensed and interrupted before harm is done to the person receiving the shock. One of the first uses for these devices was the monitoring of swimming pool lighting systems. However, there is now a steady growth in their utilization in other wiring systems.

The most common type of ground fault circuit interrupter utilizes a toroidal magnetic core upon which are wound a pair of primary windings of relatively few turns connected in series respectively, with the line and neutral conductors supplying the load. These windings are polarized in such a way that, under normal current flow conditions, they produce equal and opposite magnetic fluxes in the core which cancel so that no net flux exists. A secondary winding, having a substantially greater number of turns, is also provided on the core and its output is supplied to a sensing circuit which, in turn, controls a circuit breaker. If an external path to ground develops, as through a human body, the currents in the primary windings become unbalanced and the resultant net flux in the core induces a voltage across the secondary winding which causes the sensing circuit to trip the circuit breaker.

Although the prior art devices are a substantial improvement over anything previously known, it would be desirable to provide certain improvements. For example, the sensitivity of existing ground fault circuit interrupters is either fixed by the circuit components or, if adjustable, is so only by reason of rather complex circuitry.

Secondly, these prior art devices usually lack no voltage or undervoltage protection. This means that, if an open circuit were to occur in the neutral line supplying the device, it would be inoperable to protect against the occurrence of an external fault to ground. While this defect has been overcome in some prior art devices it has only been by means of rather involved circuitry or the addition of a separate circuit breaker.

Third, most of the prior art devices are insensitive to short circuits occurring from neutral to ground under no load conditions.

Finally, many of the prior art devices require a separate direct current source to operate.

SUMMARY OF THE INVENTION

A ground fault circuit interrupter includes first and second conductors connectable between a power supply and a load and a closed magnetic core. On the core are a first primary winding and a second primary winding in series, respectively, with the first and second conductors, the magnetic fluxes produced in the core by these windings substantially canceling when the conductor currents are equal. Also on the core are a biasing winding connected between the conductors and a secondary winding. Circuit breaker means is in one of the conductors. Sensing circuit means is provided which is responsive to the voltage induced in the secondary winding for maintaining the circuit breaker means closed when the voltage exceeds a preselected minimum value.

BRIEF DESCRIPTION OF THE DRAWING

This invention may be best understood by reference to the drawing wherein.

DESCRIPTION OF THE PREFERRED EMBODIMENTS

The present invention employs a circuit which, although at first appearing to be substantially identical with prior art devices, actually operates in a completely different manner in that the secondary winding is normally energized but becomes deenergized upon the occurrence of a ground fault.

Figure 1:
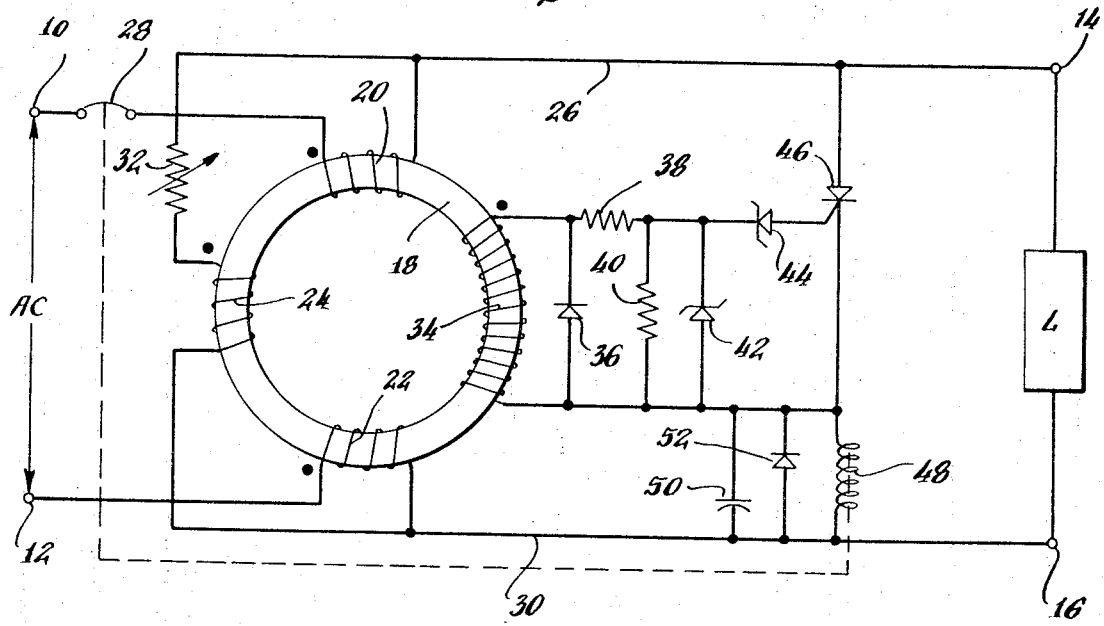
FIG. 1 is a circuit diagram of a ground fault circuit interrupter embodying this invention.

As illustrated in FIG. 1 the device includes input terminal 10, 12 for connection, respectively, to the line and neutral sides of a single phase AC source, and output terminals 14, 16 for connection to a load L. A toroidal magnetic core 18 is provided having thereon three substantially identical windings, primary windings 20, 22 and biasing winding 24. The primary winding 20 is connected in series with line conductor 26 between terminals 10 and 14. A circuit breaker 28 is also connected in line conductor 26 between input terminal 10 and primary winding 20. The primary winding 22 is connected in series with neutral conductor 30 between terminals 12 and 16. From the polarity markings it will be noted that windings 20, 22 produce opposing fluxes which are normally canceling when the currents in conductors 26, 30 are equal.

The biasing winding 24 is connected in series with a rheostat 32 across line conductor 26 and neutral conductor 30 on the load side of primary windings 20, 22. From the polarity marking on the diagram, it will be apparent that the flux produced by biasing winding 24 opposes that of primary winding 20 but aids that of primary winding 22.

A secondary winding 34 having a substantially greater number of turns than any of windings 20, 22 and 24 is also provided on the same core. It is polarized as indicated so that any voltage induced in it by biasing winding 24 will be in phase with the line voltage. A rectifying diode 36 is connected across the secondary winding 34. The rectified output of secondary winding 34 is supplied through resistor 38 and across resistor 40 across a regulating diode 42 of the avalanche type. The regulated voltage is supplied through a similar diode 44 to the gate of a silicon controlled rectifier 46. Rectifier 46 is connected in series with the no voltage coil 48 of circuit breaker 28 between line conductor 26 and neutral conductor 30. Connected across coil 48 are a smoothing capacitor 50 and a rectifying diode 52.

The operation of the circuit of FIG. 1 will now be explained by first assuming normal conditions with no ground fault. As has been explained, no net flux is then produced by primary windings 20, 22. However, a flux is produced by biasing winding 24, although its magnitude is limited by the setting of rheostat 32. Accordingly, in contrast to prior art devices a voltage is induced in secondary winding 34 under normal operating conditions. When this voltage is greater than the breakover voltage of diode 44, the rectifier 46 is maintained in its conductive state and energizes coil 48 to keep circuit breaker 28 closed.

Assume, now, that a leakage current to ground develops which bypasses primary winding 22. The current through primary winding 20 will now be greater than that through primary winding 22. However, the flux produced by the latter is aided by the flux produced by biasing winding 24. When the leakage current becomes equal to the current through biasing winding 24, the net flux produced in core 18 becomes zero, as does the voltage induced in secondary winding 34. Thus, the rectifier 46 goes into its nonconductive state, deenergizing coil 48 and tripping open the circuit breaker 28.

It is important to note that, if the leakage current is greater than the current established through biasing winding 24 by means of rheostat 32, a corresponding voltage will be induced in secondary winding 34 but it will be 180° out of phase with the line voltage and, accordingly, will not return rectifier 46 to its conducting state. It will thus be apparent that the tripping threshold of the circuit of FIG. 1 can be easily established by adjustment of rheostat 32.

It will also be noted that the circuit of FIG. 1 includes a novel no voltage feature as closure of the circuit breaker is dependent upon current flow through primary winding 24. Thus, any disruption of the power supply will immediately place the rectifier 46 in its nonconducting state and cause circuit breaker 28 to open.

To understand another feature of this invention, assume that no load is connected between terminals 14, 16 and that a short circuit develops between neutral conductor 30 and ground. A current path will then be established from input terminal 10 through primary winding 20, biasing winding 24 and conductor 30 to ground. As the polarities of windings 20 and 24 are in opposition, there will be no net flux in core 18 and the circuit will function in the same manner as previously described to open circuit breaker 28.

In the illustration of FIG. 1 the primary winding 24 is connected to the load side of windings 20, 22. It could also be connected across the supply sides. However, the illustrated connection gives better stability against line voltage and load current fluctuations. The current through biasing winding 24 will fluctuate with the currents through the windings 20, 22 in response to load changes and maintain a constant ratio between them.

Many variations in component sizes and capacities will suggest themselves to one skilled in the art. In one modification of the circuit of FIG. 1 the components have the following values: primary windings 20, 22 and biasing winding 24 are each six turns of number 14 wire; winding 34 is 1,500 turns of number 40 wire; rheostat 32 has a resistance of 50,000 ohms; resistor 38 is 22,000 ohms; resistor 40 is 47,000 ohms; diodes 36 and 52 are 1N4004; diodes 42 and 44 are IN4728; capacitor 50 is 2 microfarads; rectifier 46 is General Electric C106B2.

Figure 2:
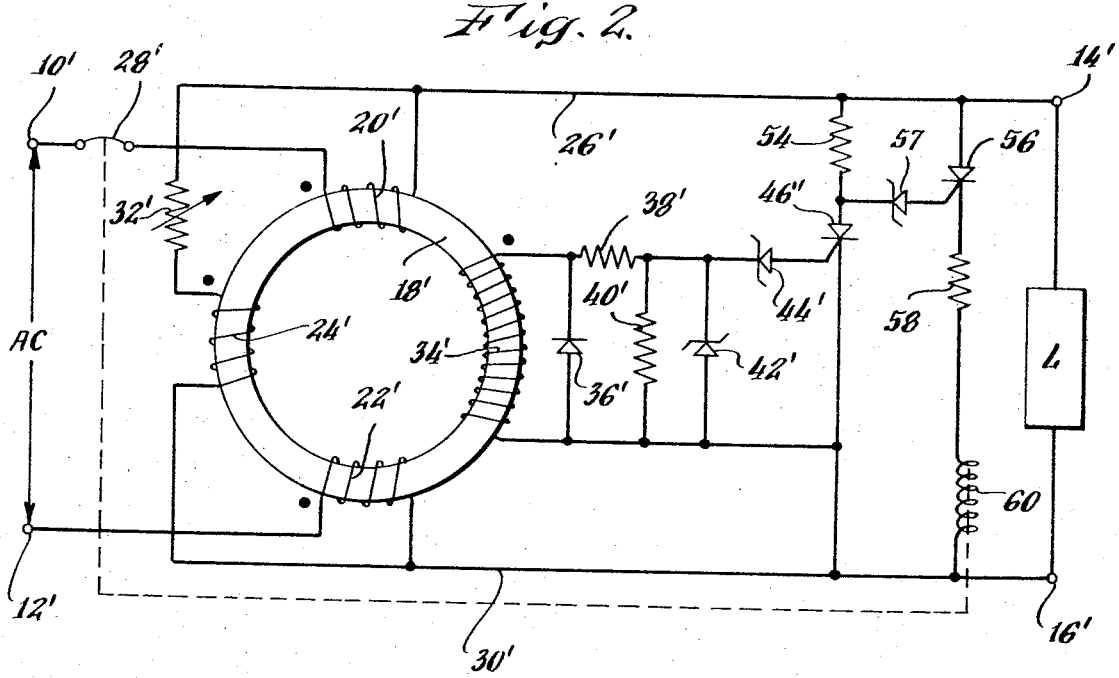
FIG. 2 is a circuit diagram of a modified ground fault circuit interrupter embodying the invention.

In FIG. 2 there is illustrated a modified version of the invention which utilizes the shunt trip coil of a circuit breaker rather than a no voltage coil. In many respects this circuit is quite similar to that of FIG. 1 and, accordingly, where applicable similar elements are given similar reference numerals but with a prime attached. The operation of this circuit is substantially the same as that of the circuit of FIG. 1 up to rectifier 46' which, it will be noted, is connected between the line conductors through a current limiting resistor 54. The gate of a second silicon controlled rectifier 56 is connected to the anode of rectifier 46' through an avalanche diode 57 and its anode-cathode circuit is in series with a current limiting resistor 58 and the shunt coil 60 of circuit breaker 28'. It will be noted that, when rectifier 46' is conducting as the result of a secondary voltage induced by biasing winding 24', the gate of rectifier 56 will be shorted to prevent this rectifier from conducting. Diodes 57 prevents the forward drop voltage developed by rectifier 46' from triggering rectifier 56. Should a leakage develop, however, rectifier 46' will become nonconductive as previously described and a gate voltage is then applied to rectifier 56 through resistor 54 and diode 57. Thus rectifier 56 will then conduct, energizing the shunt trip coil 60 and opening the circuit breaker 28'. In this modification, the circuit values are substantially the same as those given for the circuit of FIG. 1. However, the number of turns of the secondary winding 34' is reduced to one thousand turns of No. 40 wire.

It is believed that the many advantages of this invention will now be apparent to those skilled in the art. The simplicity of the circuit is self-evident, as is the fact that it contains only solid state elements. Thus it is highly reliable and may be produced in an extremely compact unit. It will also be apparent that a number of variations and modifications may be made in this invention without departing from its spirit and scope.

We claim:

1. A ground fault circuit interrupter which comprises: first and second conductors connectable between a power supply and a load; a closed magnetic core; a first primary winding on said core in series with said first conductor; a second primary winding on said core in series with said second conductor, the magnetic flux produced in said core by said second winding substantially canceling the flux produced by said first winding when the currents in said conductors are equal; a biasing winding on said core connected across said first and second conductors; a secondary winding on said core; circuit breaker means in one of said conductors; and sensing circuit means responsive to the voltage induced in said secondary winding for maintaining said circuit breaker means closed when said voltage exceeds a preselected minimum value.

2. The interrupter of claim 1 further including means for controlling current flow through said biasing winding.

3. The interrupter of claim 2 wherein said current control means is a rheostat.

4. The interrupter of claim 1 wherein said sensing circuit means comprises: solid state switching means connected between said first and second conductors; means for triggering said switching means into its conductive state when the induced secondary voltage exceeds said preselected minimum value; and circuit breaker coil means responsive to current flow through said switching means.

5. The interrupter of claim 4 wherein said coil means is in series with said switching means.

6. The interrupter of claim 4 wherein second solid state switching means is connected between said first and second conductors and is triggered into its conductive state when the other switching means becomes nonconductive, said coil means being in series with said second switching means.

7. The interrupter of claim 4 wherein said switching means is a controlled rectifier having its gate and cathode connected across said secondary winding.

8. The interrupter of claim 7 wherein an avalanche diode is in series between said secondary winding and said gate. second winding 9. The interrupter of claim 1 further including means for rectifying the output of said secondary winding.

10. A ground fault circuit interrupter which comprises: first and second conductors connectable between a power supply and a load; a first primary winding on said core in series with said first conductor; a second primary winding on said core in series with said second conductor, the magnetic flux produced in said core by said second winding substantially canceling the flux produced by said first winding when the currents in said conductors are equal; a biasing winding on said core connected across said first and second conductors; a rheostat in series with said biasing winding; a circuit breaker operating coil; a controlled rectifier having its anode-cathode circuit in series with said operating coil across said first and second conductors and its gate-cathode circuit across said secondary winding; an avalanche diode in series with the gate of said controlled rectifier; and means for rectifying the output of said secondary winding.

Notice of Adverse Decision in Interference

In Interference No. 97,733 involving Patent No. 3,555,360, S. C. Lee and C. E. Brockway, PHASE CONTROLLED GROUND FAULT CIRCUIT INTERRUPTER, final judgment adverse to the patentees was rendered May 28, 1974, as to claims 1, 2, 3, 5 and 7.

[*Official Gazette November 12, 1974.*]

Disclaimer 3,555,360.—*Sung Chuel Lee*, Bridgeport, and *Clifford E. Brockway*, North Haven, Conn. PHASE CONTROLLED GROUND FAULT CIRCUIT INTERRUPTER. Patent dated Jan. 12, 1971. Disclaimer filed Aug. 21, 1974, by the assignee, *Harvey Hubell, Incorporated*.

Hereby enters this disclaimer to claims 1, 2, 3, 4, 5, 6, 7, 8 and 9 of said patent.

[*Official Gazette March 25, 1975.*]